No. 608,033. Patented July 26, 1898.
J. R. ECOB.
APPARATUS FOR STRETCHING YARN WHILE MERCERIZING.
(Application filed Dec. 20, 1897.)
(No Model.) 2 Sheets—Sheet 1.
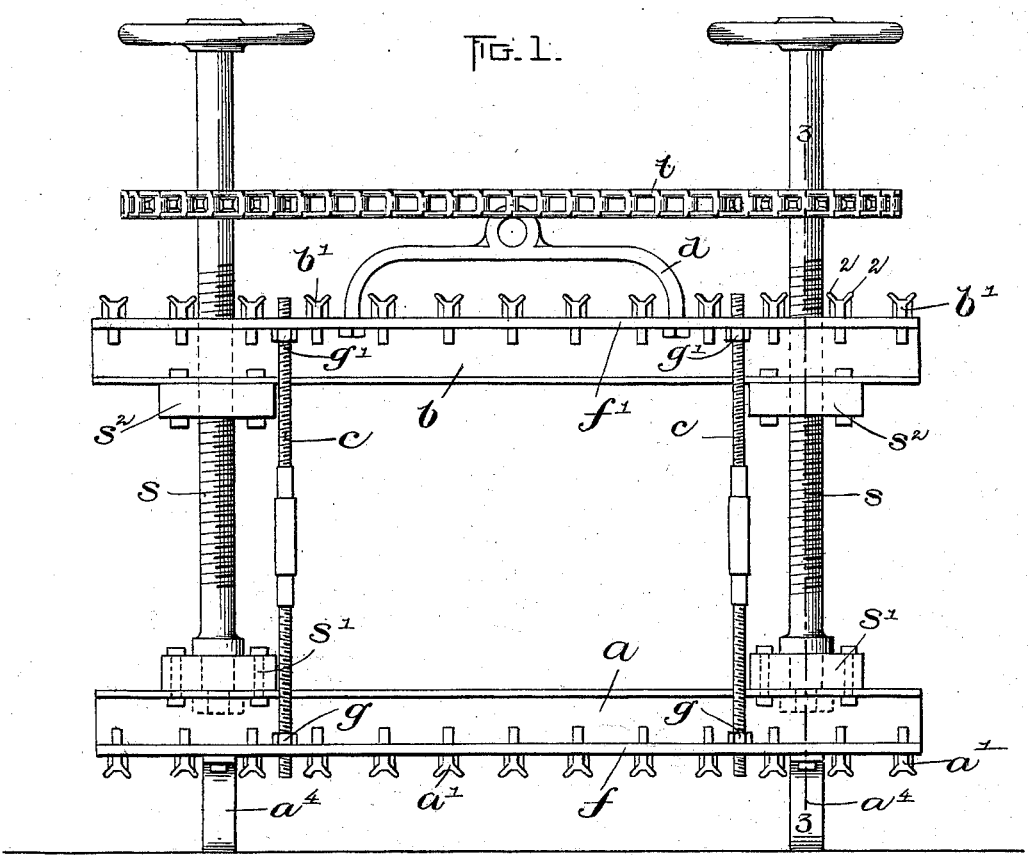
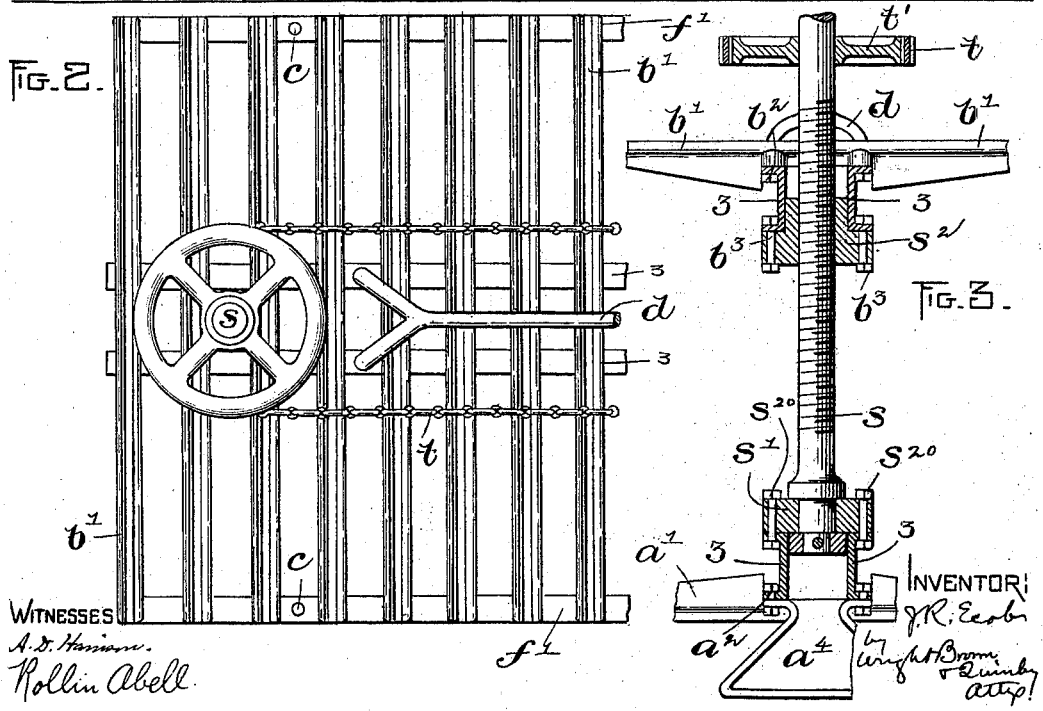
WITNESSES
INVENTOR No. 608,033. Patented July 26, 1898.
J. R. ECOB.
APPARATUS FOR STRETCHING YARN WHILE MERCERIZING.
(Application filed Dec. 20, 1897.)
(No Model.) 2 Sheets—Sheet 2.
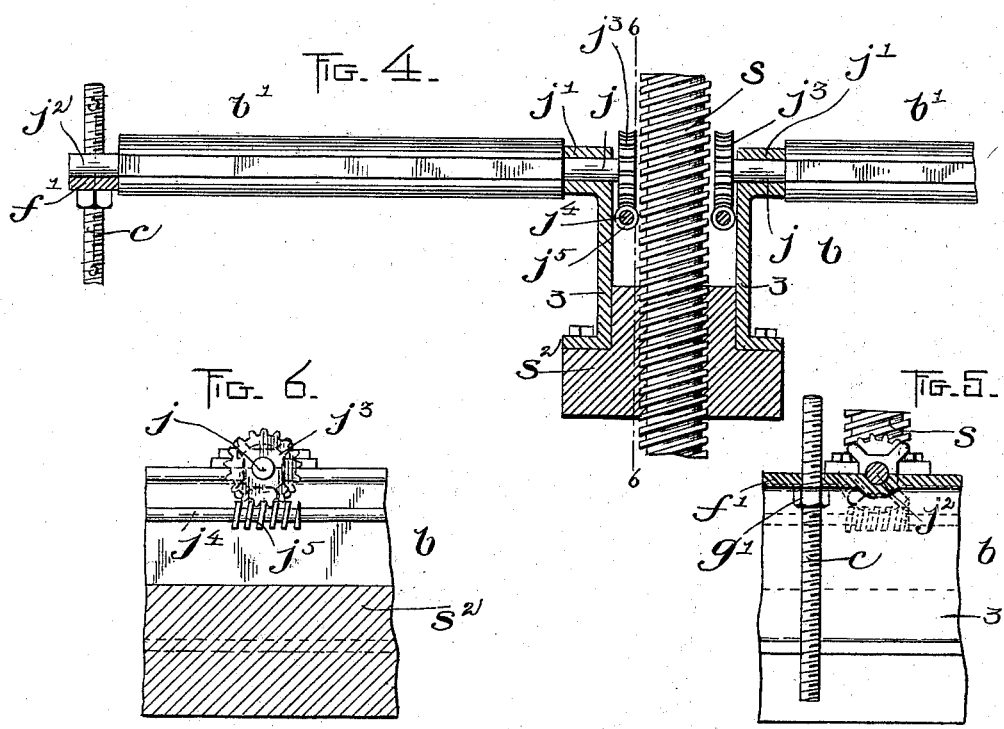
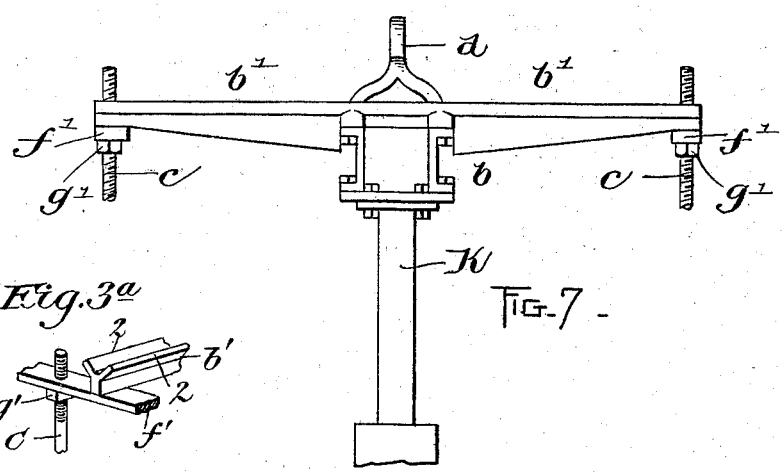
WITNESSES:
A. D. Harrison.
Rollin Abell.
INVENTOR
J. R. Ecob
by Wright Brown & Quinby
attys.

UNITED STATES PATENT OFFICE.

JOHN ROBERTS ECOB, OF LAWRENCE, MASSACHUSETTS.

APPARATUS FOR STRETCHING YARN WHILE MERCERIZING.

SPECIFICATION forming part of Letters Patent No. 608,033, dated July 26, 1898.

Application filed December 20, 1897. Serial No. 662,513. (No model.)

*To all whom it may concern:*

Be it known that I, JOHN ROBERTS ECOB, of Lawrence, in the county of Essex and State of Massachusetts, have invented certain new and useful Improvements in Yarn-Stretching Apparatus, of which the following is a specification.

This invention has for its object to provide an apparatus adapted to hold a large number of skeins of yarn or thread and to exert suitable tension thereon, so that the yarn may be immersed while under tension in a bath of caustic alkali during the process of mercerizing.

The invention consists in the improved apparatus which I will now proceed to describe and claim.

Of the accompanying drawings, forming a part of this specification, Figure 1 represents a side elevation of an apparatus embodying my invention. Fig. 2 represents a top view of the same. Fig. 3 represents a section on line 3 3 of Fig. 1. Fig. 3ª represents a fragmentary perspective view. Fig. 4 represents a view similar to Fig. 3, showing means for rotating the skein-holding arms. Fig. 5 represents a section on line 5 5 of Fig. 4. Fig. 6 represents a section on line 6 6 of Fig. 4. Fig. 7 represents a modification.

The same letters and numerals of reference indicate the same parts in all the figures.

In carrying out my invention I provide two heads or frames $a$ $b$. Said frames are connected in such manner that one is movable toward and from the other, the preferred connecting means being screw-threaded shafts $s$ $s$. Said shafts are preferably journaled in bearings $s'$ $s'$ on the frame $a$, their threaded portions being engaged with nuts $s^2$ $s^2$, affixed to the frame $b$. The said screw-shafts may be rotated by any suitable means. I have here shown connections between the two shafts, whereby they may be rotated in unison, said connections comprising sprocket-wheels $t'$, affixed to the shafts, and a sprocket-chain $t$, connecting said wheels.

The frame $a$ is provided with a series of arms $a'$, extending crosswise of the frame and projecting from opposite sides thereof. The frame $b$ is provided with a series of arms $b'$, corresponding in number and position with the arms $a'$, each arm $a'$ and the corresponding arm $b'$ being adapted to support a series of skeins of yarn, the skeins bearing on the upper edge of the arm $b'$ and on the bottom edge of the arm $a'$. The portions of the arms $a'$ and $b'$ on which the skeins bear are formed to present narrow edges to the yarn to avoid covering or obstructing any considerable portions of the yarn, the object being to give the solution in which the yarn is immersed free access to all parts of the yarn, including those which bear upon the arms. To this end I make the arm of the grooved form illustrated in Fig. 1, there being two relatively thin edges 2 2, on which the yarn bears.

Operation: The apparatus is adjusted by moving the frame $b$ toward the frame $a$ sufficiently to permit the skeins of yarn to be readily arranged upon the arms $a'$ and $b'$, the skeins being placed side by side until the arms are suitably filled. The frame $b$ is then raised or moved from the frame $a$, thereby exerting tension simultaneously on all the skeins. When the skeins have been suitably stretched, they are subjected to the action of an alkaline bath, and to this end the apparatus may be lowered into a tank or vat containing said bath, the frame $b$ being provided with a suspending device or bail $d$, which may be connected with a crane or other appliance adapted to raise and lower the apparatus.

To prevent the outer ends of the arms $a'$ and $b'$ from yielding or springing toward each other under the strain to which they are subjected when the yarn is being stretched, I provide adjustable supports, which are preferably frames adapted to be interposed between the outer portions of the two series of arms. Each support or frame is here shown as composed of two struts or braces $c$ $c$ and bars $f f'$, engaged with said struts and extending across the outer portions of the arms $a'$ $b'$, the bar $f$ bearing on the upper edges of the arms $a'$, while the bar $f'$ bears on the lower edges of the arms $b'$. The struts $c$ $c$ are screw-threaded and engaged with nuts $g$ and $g'$ on the bars $f f'$, each strut having a right-hand thread at one end and a left-hand thread at the other. It will be seen that by suitably rotating the strut-rods $c$ $c$ the bars $f f'$ may be adjusted to correspond with any adjustment of the frame $b$, so that the outer ends of the arms $a'$ $b'$ will be firmly supported and prevented from yielding or springing inwardly. The bars $f f'$ preferably rest on the arms $a'$ $b'$ without positive connection therewith, said bars and the struts $c c$ constituting adjustable frames, which are removable from the apparatus.

The frames $a b$ may be of any suitable construction and are here shown as composed of flanged plates or bars 3 3. The arms $a'$ are connected to the bottom flanges of the frame $a$ by means of bolts $a^2$, the top flanges of said frame being connected with the bearings $s'$ by means of bolts $s^{20}$. The bottom flanges of the top frame $b$ are connected by bolts $b^2$ with the arms $b'$ and by bolts $b^3$ with ears or flanges on the nuts $s^2$. The lower frame $a$ is provided with legs or supports $a^4$.

I prefer to make the arms $a'$ $b'$ or the portions thereof on which the yarn bears of some material which will not be affected by the solution in which the apparatus is immersed, suitable materials being glass, porcelain, lead, manganese-bronze, &c. When the material is too brittle or weak to be used for the entire arm, the arm may be of compound construction and may comprise a suitable base or body of iron or steel and a covering material adapted to resist the corrosive action of the bath.

The arms $a'$ $b'$ may be provided with journals $j$, fitted to turn in bearings $j'$ on the frames or heads $a b$, as shown in Fig. 4, so that each arm can be given a partial rotation to bring fresh parts of the yarn into contact with the bearing edges of the arms, thus exposing the portions of the yarn which were at first covered by the said bearing edges. Suitable mechanism may be employed for turning the arms in their bearings to move the skeins for this purpose, such mechanism being, for example, worm-gears $j^3$, affixed to the journals $j$, and shafts $j^4$, extending crosswise of the arms and provided with worms $j^5$, engaging the worm-gears $j^3$. In this case instead of making each arm extend continuously across its supporting-frame each arm is or may be made in two sections, one projecting from one side of the frame and the other from the opposite side, each section having a gear $j^3$. Two shafts $j^4$ will therefore be employed, and these shafts may be geared together at their ends for simultaneous rotation. The outer ends of the arms have journals $j^2$, adapted to rotate on the bars of the supporting-frames.

It will usually be sufficient to positively rotate only the upper arms, the lower arms being allowed to rotate loosely, so that they will be turned in their bearings by the yarn when it is moved by the upper arms.

Instead of the screw-shafts here shown for adjusting the movable series of arms I may employ hydraulic jacks $k$, interposed between the two heads or frames $a b$. (See Fig. 7.)

The bars $f f'$ may be faced with a yielding material, such as rubber, to furnish bearings for the outer ends of the arms $a'$ and $b'$ of a character adapted to prevent liability of breaking or cracking the coverings of said arms when the same are made of brittle material.

I claim—

1. A yarn-stretching apparatus comprising two heads or frames, each having a series of arms, means for adjusting one frame toward or from the other, and adjustable supports between the outer portions of the two series of arms.

2. A yarn-stretching apparatus comprising two heads or frames, each having a series of arms, means for adjusting one frame toward or from the other, and adjustable supporting-frames bearing on the outer portions of said arms.

3. A yarn-stretching apparatus comprising two heads or frames, each having a series of arms, screw-shafts journaled in bearings on one frame and engaged with nuts on the other frame, and shaft-rotating means acting simultaneously on said screw-shafts.

4. A yarn-stretching apparatus comprising two heads or frames, each having a series of journaled arms and each arm having a plurality of yarn-supporting edges, means for adjusting the movable frame toward and from the other, and means for turning the arms in their bearings to move the yarn relatively to said bearing edges.

In testimony whereof I have signed my name to this specification, in the presence of two subscribing witnesses, this 14th day of December, A. D. 1897.

JOHN ROBERTS ECOB.

Witnesses:
 WILLIAM QUINBY,
 C. F. BROWN.